United States Patent
Harer et al.

(10) Patent No.: US 7,401,789 B2
(45) Date of Patent: Jul. 22, 2008

(54) RACK BUSHING FOR RACK AND PINION STEERING ASSEMBLY

(75) Inventors: Dennis F. Harer, Kingsport, TN (US); Eric A. Roline, Morristown, TN (US); William E. Allen, Jr., Kingsport, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 371 days.

(21) Appl. No.: 11/146,751

(22) Filed: Jun. 7, 2005

(65) Prior Publication Data

US 2007/0017732 A1    Jan. 25, 2007

(51) Int. Cl.
*F16C 33/02*    (2006.01)

(52) U.S. Cl. .............. 277/585; 277/549; 277/582; 277/407; 180/428; 74/89.12

(58) Field of Classification Search ........... 277/585, 277/582, 569, 549, 551, 434, 407; 180/428; 74/89.12

See application file for complete search history.

(56) References Cited

U.S. PATENT DOCUMENTS

| | | | |
|---|---|---|---|
| 5,181,581 A | | 1/1993 | Engler et al. |
| 5,286,014 A | * | 2/1994 | Chakko ............. 267/293 |
| 5,709,283 A | * | 1/1998 | Nief ............... 180/428 |
| 5,895,051 A | * | 4/1999 | Bowers ............. 277/346 |
| 6,209,183 B1 | | 4/2001 | Bugosh |
| 6,330,929 B1 | | 12/2001 | Gierc et al. |
| 6,467,566 B1 | | 10/2002 | Harer et al. |
| 6,485,180 B2 | * | 11/2002 | Mena ............... 384/222 |
| 6,644,430 B2 | * | 11/2003 | Harer et al. ......... 180/428 |
| 6,681,885 B2 | | 1/2004 | Harer |
| 2002/0085778 A1 | * | 7/2002 | Mena ............... 384/276 |
| 2003/0052468 A1 | * | 3/2003 | Harer ............... 280/93.514 |
| 2006/0219467 A1 | * | 10/2006 | Damore et al. ....... 180/428 |
| 2006/0266140 A1 | * | 11/2006 | Harer .............. 74/89.12 |
| 2006/0291923 A1 | * | 12/2006 | Jang et al. .......... 399/333 |

FOREIGN PATENT DOCUMENTS

GB    1214032    11/1970

* cited by examiner

*Primary Examiner*—Kevin Hurley
(74) *Attorney, Agent, or Firm*—MacMillan, Sobanski & Todd, LLC

(57) ABSTRACT

The invention contemplates a rack bushing and a rack and pinion steering assembly for use in a vehicle that includes such a rack bushing. The steering assembly may include a housing having a tubular rack portion with a tubular end, a rack mounted in the tubular rack portion and extending out of the tubular end, and a rack bushing mounted in the rack portion around the rack. The rack bushing includes a generally annular main body portion having a generally cylindrical inner surface centered about the axis and supporting the rack, an outer surface centered about the axis and including a generally cylindrical main surface adapted to engage the tubular end of the housing, and a first end and an opposed second end. The rack bushing may include a plurality of bores extending within the main body axially from the first end a portion of the way toward the second end. The rack bushing may also include a plurality of channels extending parallel to the axis, recessed in, and spaced circumferentially around the outer surface.

12 Claims, 4 Drawing Sheets

RACK BUSHING FOR RACK AND PINION STEERING ASSEMBLY

BACKGROUND OF INVENTION

The present invention relates generally to automotive vehicle steering systems and, in particular, to a rack bushing used in a rack and pinion steering assembly.

A typical hydraulic rack and pinion power steering assembly used in a vehicle includes a rack that extends axially through a hydraulic chamber inside a hydraulic housing. The ends of the rack project axially outward from each end of the housing and are connected with steering linkages that connect to steerable vehicle wheels. A piston is fixed to the rack within the hydraulic chamber. Rotation of the vehicle steering wheel actuates a hydraulic valve and causes hydraulic fluid under pressure to act against the piston. The force exerted by the hydraulic fluid moves the piston within the housing, causing the rack to move axially. The axial movement of the rack moves the steering linkages that, in turn, cause the corresponding vehicle wheels to turn.

To prevent hydraulic fluid from flowing out of the housing, it is necessary to seal the ends of the housing through which the rack projects. It is also desirable to support the rack for axial movement within the housing without losing the integrity of the seal. A bushing and seal assembly is typically used for this purpose. It is also known to enclose the ends of the housing with bellows attached to the outside of the housing to prevent moisture, dirt or other contaminants from entering and interfering with the operation of the rack.

Machined or cast metal rack bushings that employ inner liners for bearing against the rack and outer rubber O-rings for sealing against the housing are known. In particular, these metal rack bushings are capable of withstanding the side loads induced on the bushing during vehicle operation. But such bushing assemblies can be more expensive than is desired and require these separate parts for the bushing assembly. Molded plastic rack bushings have also been employed. While these plastic bushings are more cost-effective than the metal bushings, they are less capable of accepting the high side loads that may be induced in the bushing during vehicle operation.

In addition, axially extending voids with generally rectangular shaped cross sections, also known as metal savers, have been included in the body of the rack bushing. While these voids are helpful in reducing the overall weight of the rack bushing assembly, the corners of these voids tend to create stress risers in the bushing.

Thus, it is desirable to have a rack bushing employed with a rack and pinion steering assembly that overcomes the drawbacks of the prior art.

SUMMARY OF THE INVENTION

According to an aspect of the invention, there is provided a rack bushing for use with a rack portion of a housing in a rack and pinion steering assembly, where the rack portion includes a tubular end centered about an axis. The rack bushing includes a generally annular main body portion having a generally cylindrical inner surface centered about the axis and adapted to support a rack, and an outer surface centered about the axis and including a generally cylindrical main surface adapted to engage the tubular end. Also, a plurality of channels extend parallel to the axis, recessed in and spaced circumferentially around the outer surface.

According to another aspect of the invention, there is provided a rack bushing for use with a rack portion of a housing in a rack and pinion steering assembly, where the rack portion includes a tubular end centered about an axis. The rack bushing includes a generally annular main body portion having a generally cylindrical inner surface centered about the axis and adapted to support a rack, an outer surface centered about the axis and including a generally cylindrical main surface adapted to engage the tubular end, and a first end and an opposed second end. It also includes a plurality of bores extending within the main body axially from the first end a portion of the way toward the second end, wherein each of the bores is cylindrical in shape.

According to another aspect of the invention, there is provided a rack and pinion steering assembly for use in a vehicle that includes a housing having a tubular rack portion with a tubular end, a rack mounted in the tubular rack portion and extending out of the tubular end, and a rack bushing. The rack bushing includes a generally annular main body portion having a generally cylindrical inner surface centered about the axis and supporting the rack, an outer surface centered about the axis and including a generally cylindrical main surface mounted in the tubular end, and a first end and an opposed second end; a plurality of bores extending within the main body axially from the first end a portion of the way toward the second end; and a plurality of channels extending parallel to the axis, recessed in, and spaced circumferentially around the outer surface.

The present invention advantageously provides a light weight and cost effective rack bushing that is relatively easy to fabricate and assemble.

Another advantage of an embodiment of the present invention is that the rack bushing assembly is strong enough to withstand the wide range of high load conditions it may encounter during vehicle operation, while maintaining good sealing characteristics with the rack housing and the rack.

DETAILED DESCRIPTION

Figure 1:
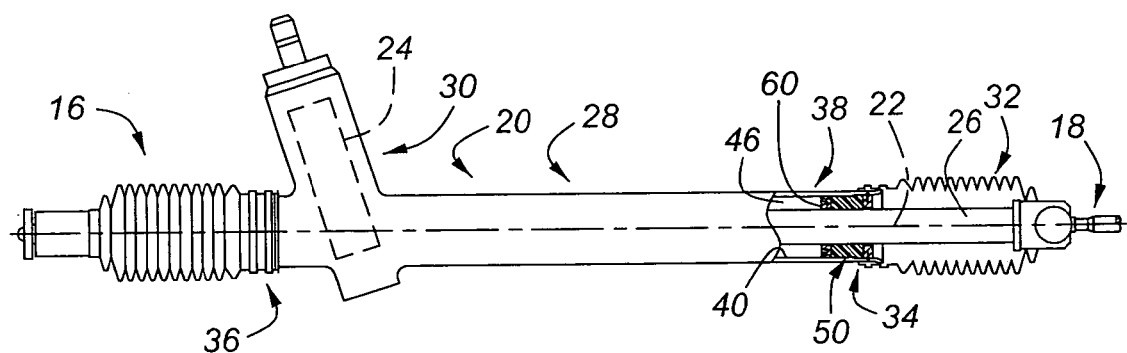
FIG. 1 is a schematic view of a rack and opinion steering assembly according to the present invention.
Figure 2:
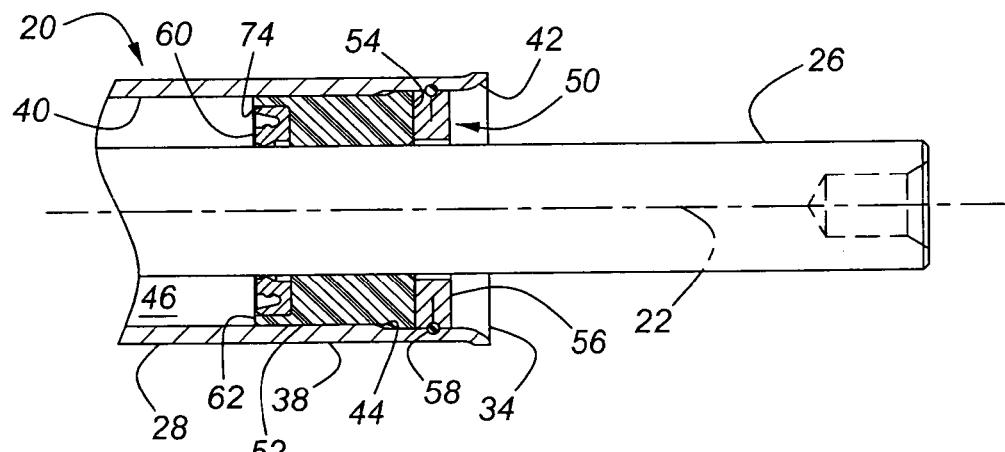
FIG. 2 is a schematic view of a portion of a first end of the rack and pinion steering assembly of FIG. 1, but without the bellows or steering linkage shown.

FIGS. 1-2 illustrate a portion of a steering assembly, indicated generally at 16, for use in a vehicle (not shown). The steering assembly 16 is connected with a pair of steerable vehicle wheels (not shown) in a known manner by a steering linkage 18 at one end of the steering assembly 16 and by a similar steering linkage (not shown) at the other end of the steering assembly 16. The steering assembly 16 includes a housing 20 defining a longitudinally oriented rack axis 22, a pinion 24, and a rack 26 that has the same rack axis as the housing 20. The housing 20 includes a longitudinally extending rack portion 28 and a transversely extending pinion portion 30. The rack 26 extends through the rack portion 28. The pinion 24 is located in the pinion portion 30 of the housing 20 and engages with the rack 26 in a known manner. A bellows 32 encircles and encloses the portion of the rack 26 extending from the housing 20. The bellows 32 mounts around and is secured to the housing 20 in a known manner, and is flexible to allow for telescopic movement of the pinion 24 relative to the housing 20 while keeping dirt and other contaminants out of the steering assembly 16.

The rack portion 28 of the housing 20 has a first tubular end 34 and an opposed second tubular end 36. The rack portion 28 at the first tubular end 34 includes a cylindrical outer surface 38 and a generally cylindrical inner surface 40. The inner surface 40 may include a flared portion 42, used for ease of assembly, a stop feature 44, and a central portion that defines a fluid chamber 46. As is known to those skilled in the art, a piston (not shown) is fixed to the rack 26 inside the fluid chamber 46. Upon rotation of the vehicle steering wheel (not shown), fluid under pressure in the fluid chamber 46 acts against the piston, causing the rack 26 to move axially within the housing 20. Such axial movement of the rack 26 causes a corresponding movement in the steering linkages 18, thus turning the steerable vehicle wheels in the desired direction.

The steering assembly 16 also includes a rack bushing assembly 50 that mounts in the first tubular end 34 around the rack 26, and centered about the rack axis 22. A similar bushing assembly (not shown) may be located at the second tubular end 36 of the housing 20. The rack bushing assembly 50 includes a rack bushing 52 having a first end 54 that abuts with a lock ring 56, which is secured in place by a retaining wire 58. The lock ring 56 and retaining wire 58 may be conventional and so will not be discussed further herein. An annular seal 60 mounts in a recess 74 on a second end 62 of the rack bushing 52 and seals around the rack 26 in a conventional manner, with the second end 62 and seal 60 defining one end of the fluid chamber 46. Alternatively, the recess 74 may be eliminated if a floating rack seal (not shown) is employed with the bushing assembly 50, which may allow the overall length of the bushing 52 to be reduced somewhat.

Figure 3:
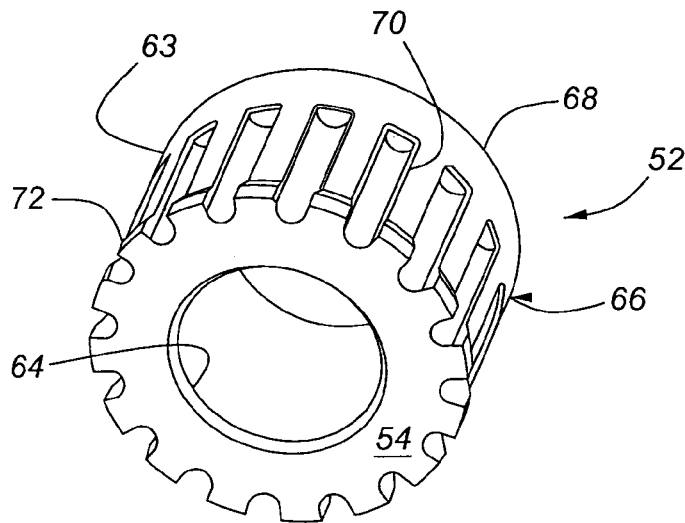
FIG. 3 is a perspective view of a rack bushing according to a first embodiment of the present invention.
Figure 4:
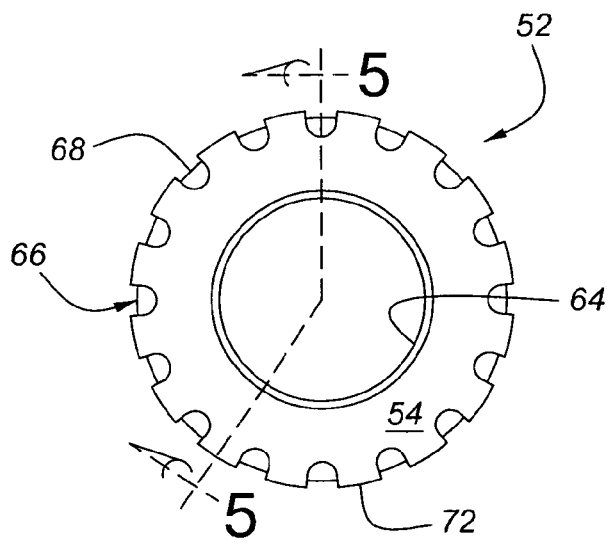
FIG. 4 is an end view of the rack bushing of FIG. 3.
Figure 5:
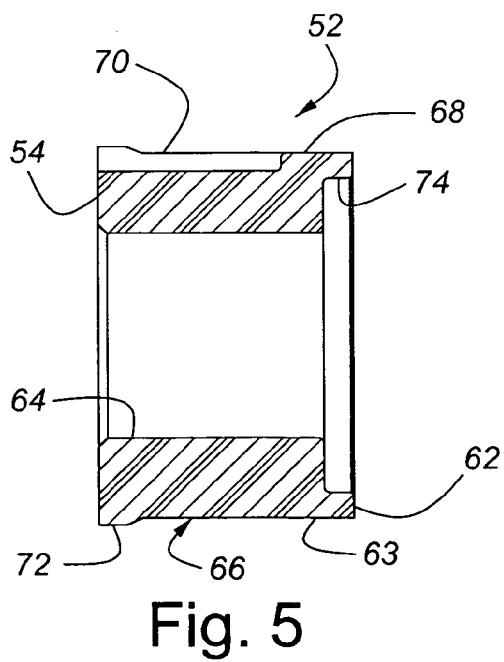
FIG. 5 is a sectional view taken a long line 5-5 in FIG. 4.

FIGS. 3-5 illustrate the rack bushing 52 of FIGS. 1 and 2 in more detail. The rack bushing 52 has a generally annular main body 63 that includes a cylindrical inner surface 64, which mates with and supports the rack 26 as it slides relative to the housing 20.

The main body 63 of the rack bushing 52 also includes an outer surface 66 that has a generally cylindrical main surface 68, with a plurality of circumferentially spaced and axially extending channels 70 recessed therein. The channels may be, for example, semi-cylindrical in shape and about one-quarter millimeter deep. The main surface 68 mates with and seals against the inner surface 40 of the rack portion 28 of the housing 20. The channels 70 extended from the first end 54 a portion of the way toward the second end 62, and preferably about sixty to eighty percent of the way from the first end 54 toward the second end 62. The channels 70 do not extend all of the way from the first end 54 to the second end 62, in this embodiment, in order for the main surface 68 to have a continuous ring of material in sealing engagement with the inner surface 40 of the rack portion 28 of the housing 20.

The main body 63 of the rack bushing 52 may also include an enlarged diameter portion 72 extending radially outward from the outer surface 66 adjacent to the first end 54 of the bushing 52. This enlarged diameter portion 72 provides for positive axial locating of the rack bushing 52 relative to the housing 20 by allowing the insertion of the rack bushing 52 into the housing 20 until the enlarged diameter portion 72 abuts the stop feature 44 in the housing 20.

The rack bushing 52 is preferably a molded part, and may be injection molded to final dimensions without any machining operations after forming. The bushing 52 may be made of a partially glass fiber filled engineered polymer, preferably about a forty to sixty-five percent glass filled polyphenylene sulfide, such as the Fortron® brand material available from Fortron Industries. This material may also include mineral fillers to improve its isotropic characteristics, if so desired. A material such as this is particularly suited to allow the bushing 52 to accept large side loads received during operation of the steering assembly 16. Other non-limiting examples of materials that may be particularly suitable for the rack bushing 52 are nylon, nylon 6-6, nylon 4-6, nylon 2-12, polyethylene terephthalate, and polybutylene terephthalate.

The preferred materials to employ in forming this bushing 52, and in particular, relatively strong, hard materials, such as Fortron®, may create concerns with cracking or shrinkage if the bushing is formed with a smooth cylindrical outside surface. The channels 70, then, improve the dimensional capability (stability) and the loading capability (controlling surface contact) of the rack bushing 52.

Figure 6:
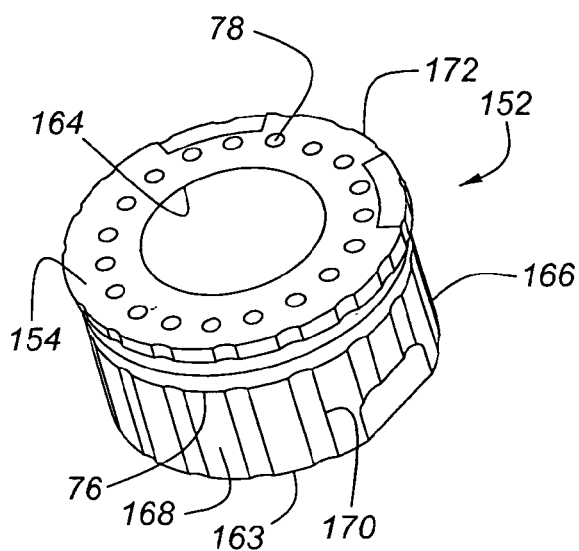
FIG. 6 is a perspective view of a rack bushing according to a second embodiment of the present invention.
Figure 7:
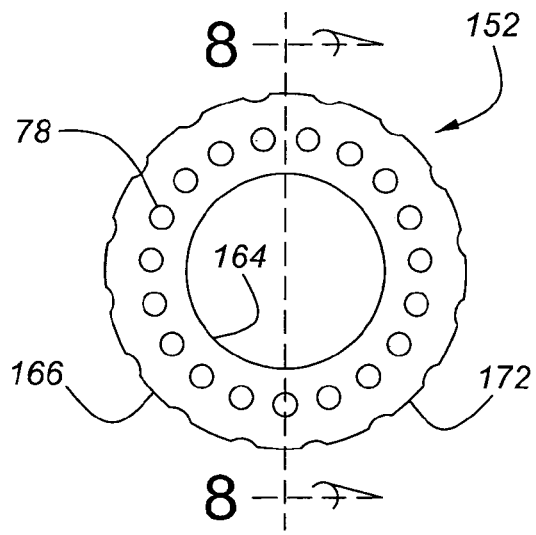
FIG. 7 is an end view of the rack bushing of FIG. 6.
Figure 8:
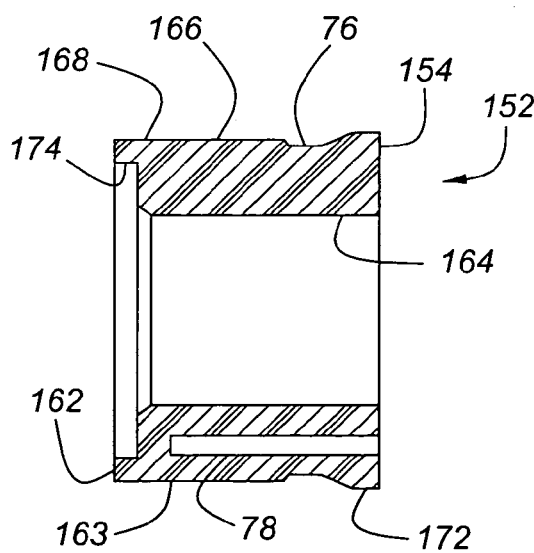
FIG. 8 is a sectional view taken along line 8-8 in FIG. 7.

FIGS. 6-8 illustrate a second embodiment of a rack bushing 152 that may be employed as part of a rack bushing assembly used with the steering assembly of FIGS. 1 and 2. In this embodiment, elements that correspond to elements in the first embodiment will have a similar element number, but with a 100-series number.

The rack bushing 152 has a generally annular main body 163 that includes a cylindrical inner surface 164, which mates with and supports the rack 26 as it slides relative to the housing 20. The main body 163 of the rack bushing 152 also includes an outer surface 166 that has a generally cylindrical main surface 168, with a plurality of circumferentially spaced and axially extending channels 170 recessed therein. The main surface 168 includes a circumferentially oriented annular seal recess 76, within which is mounted a seal (not shown). The second end 162 may include a recess 174 for receiving an annular seal (not shown in FIGS. 6-8) therein. As an alternative, the seal recess 76 and the recess 174 may be reduced or eliminated if a floating type rack seal is employed, which may allow the overall length of the bushing 152 to be reduced somewhat.

The main body 163 of the rack bushing 152 may also include an enlarged diameter portion 172 extending radially outward from the outer surface 166 adjacent to the first end 154 of the bushing 152. This enlarged diameter portion 172 provides for positive axial locating of the rack bushing 152 relative to the housing 20 by allowing the insertion of the rack bushing 152 into the housing 20 until the enlarged diameter portion 172 abuts the stop feature 44 in the housing 20.

The rack bushing 152 may also have a plurality of circumferentially spaced, axially extending cylindrical bores 78 located within the main body 163. The cylindrical bores 78 reduce the weight of the rack bushing 152 while still maintaining adequate part strength. The cylindrical bores 78 extend from the first end 154 only a portion of the way toward the second end 162 of the rack bushing 152. If they extended to all of the way through, the annular seal 60 would have incomplete support. Preferably, these cylindrical bores 78 extend about seventy five percent of the way from the first end 154 toward the second end 162 of the rack bushing 152. The bores 78 are cylindrical in shape in order to avoid stress risers, which can occur with other shapes of bores, such as those with generally rectangular cross sections. While bores are not shown in the bushing of FIGS. 3-5, the rack bushing of the first embodiment may also include these bores, if so desired.

As with the first embodiment, the rack bushing 152 is preferably a molded part, and may be injection molded from a suitable material, such as those discussed relative to the bushing of the first embodiment.

Figure 9:
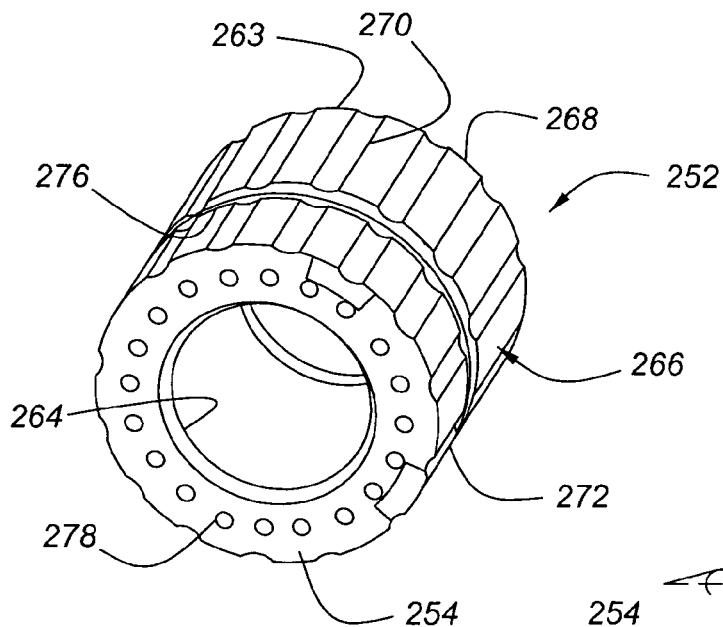
FIG. 9 is a perspective view of a rack bushing according to a third embodiment of the present invention.
Figure 10:
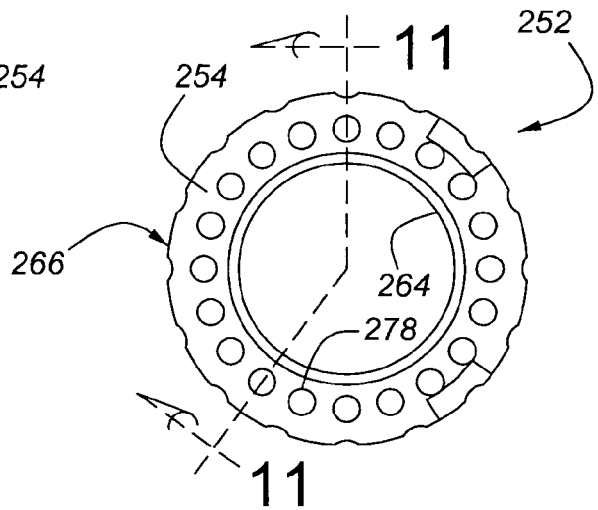
FIG. 10 is an end view of the rack bushing of FIG. 9.
Figure 11:
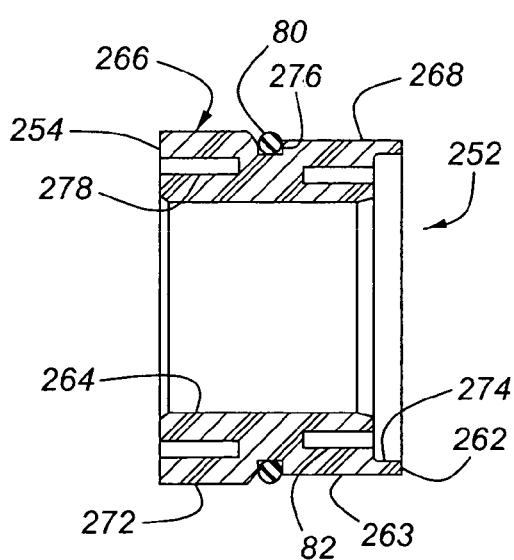
FIG. 11 is a sectional view taken along line 11-11 in FIG. 10, and with an O-ring seal shown mounted on the bushing.

FIGS. 9-11 illustrate a third embodiment of a rack bushing 252 that may be employed as part of a rack bushing assembly used with the steering assembly of FIGS. 1 and 2. In this embodiment, elements that correspond to elements in the first or second embodiment will have a similar element number, but with a 200-series number.

The rack bushing 252 has a generally annular main body 263 that includes a cylindrical inner surface 264, which mates with and supports the rack 26 as it slides relative to the housing 20. The main body 263 of the rack bushing 252 also includes an outer surface 266 that has a generally cylindrical main surface 268, with a plurality of circumferentially spaced and axially extending channels 270 recessed therein. The main surface 268 includes a circumferentially oriented annular seal recess 276, within which is mounted an elastomeric O-ring 80 (shown in FIG. 11 only). The second end 262 may include a recess 274 for receiving an annular seal (not shown in FIGS. 9-11) therein. As an alternative, the seal recess 276 and the recess 274 may be reduced or eliminated if a floating type rack seal is employed, which may allow the overall length of the bushing 252 to be reduced somewhat.

The main body 263 of the rack bushing 252 may also include an enlarged diameter portion 272 extending radially outward from the outer surface 266 adjacent to the first end 254 of the bushing 252. This enlarged diameter portion 272 provides for positive axial locating of the rack bushing 252 relative to the housing 20 by allowing the insertion of the rack bushing 252 into the housing 20 until the enlarged diameter portion 272 abuts the stop feature 44 in the housing 20.

The rack bushing 252 may also have a first set of circumferentially spaced, axially extending cylindrical bores 278 located within the main body 263. The first set of cylindrical bores 278 extend from the first end 254 a portion of the way toward the second end 262 of the rack bushing 252. A second set of circumferentially spaced, axially extending cylindrical bores 82 are also located within the main body 263. The second set of bores 82 extend from the second end 262 only a portion of the way toward the first end 254 of the rack bushing 252. The bores 278 in the first set do not connect with the bores 82 in the second set, otherwise they would reduce the material thickness under the seal recess 276 more than may be desirable. The bores 278, 82 are cylindrical in shape in order to avoid stress risers. As with the first embodiment, the rack bushing 252 is preferably a molded part and may be injection molded from a suitable material, such as those discussed relative to the bushing of the first embodiment.

While certain embodiments of the present invention have been described in detail, those familiar with the art to which this invention relates will recognize various alternative designs and embodiments for practicing the invention as defined by the following claims.

What is claimed is:

1. A rack bushing for use with a rack portion of a housing in a rack and pinion steering assembly, where the rack portion includes a tubular end centered about an axis, the rack bushing comprising:

a generally annular main body portion having a generally cylindrical inner surface centered about the axis and adapted to support a rack, and an outer surface centered about the axis and including a generally cylindrical main surface adapted to engage the tubular end; and a plurality of channels extending parallel to the axis, recessed in and spaced circumferentially around the outer surface, each of the plurality of channels recessed in the outer surface having an arcuate cross sectional shape.

2. The rack bushing of claim 1 wherein the main body is made of a partially glass fiber filled polymer.

3. The rack bushing of claim 2 wherein the polymer is polyphenylene sulfide.

4. The rack bushing of claim 2 wherein the polymer is about forty to sixty-five percent glass fiber filled.

5. The rack bushing of claim 1 wherein the main body includes a first end and an opposed second end and the plurality of channels extend from the first end a portion of the way toward the second end.

6. The rack bushing of claim 1 wherein the main body includes a first end and a second end, and the outer surface includes an enlarged diameter portion adjacent to the first end and adapted to abut a stop feature in the rack portion of the housing.

7. The rack bushing of claim 1 wherein the main body includes a first end and an opposed second end and includes a plurality of bores extending within the main body axially from the first end a portion of the way toward the second end.

8. The rack bushing of claim 7 wherein each of the bores are generally cylindrical in shape.

9. The rack bushing of claim 1 further including a circumferentially oriented annular recess extending around the outer surface and adapted to receive a seal therein.

10. A rack and pinion steering assembly for use in a vehicle comprising:

a housing having a tubular rack portion with a tubular end;

a rack mounted in the tubular rack portion and extending out of the tubular end;

a rack bushing including a generally annular main body portion having a generally cylindrical inner surface centered about the axis and supporting the rack, an outer surface centered about the axis and including a generally cylindrical main surface mounted in the tubular end, and a first end and an opposed second end; a plurality of bores extending within the main body axially from the first end a portion of the way toward the second end; and a plurality of channels extending parallel to the axis, recessed in, and spaced circumferentially around the outer surface.

11. The rack and pinion steering assembly of claim 10 wherein the rack portion of the housing includes a stop feature adjacent to the tubular end and the outer surface includes an enlarged diameter portion adjacent to the first end abutting the stop feature.

12. The rack and pinion steering assembly of claim 10 further including a second plurality of bores extending within the main body axially from the second end a portion of the way toward the first end.

* * * * *